United States Patent
Amundsen et al.

(10) Patent No.: US 10,012,422 B1
(45) Date of Patent: Jul. 3, 2018

(54) HVAC/R SYSTEM SEALANT AND DRYING COMPOSITION, AND METHOD FOR SEALING AND REMOVING MOISTURE THEREWITH

(71) Applicants: Ted J. Amundsen, Satellite Beach, FL (US); Robert P. Scaringe, Rockledge, FL (US)

(72) Inventors: Ted J. Amundsen, Satellite Beach, FL (US); Robert P. Scaringe, Rockledge, FL (US)

(73) Assignee: MAINSTREAM ENGINEERING CORPORATION, Rockledge, FL (US)

( * ) Notice: Subject to any disclaimer, the term of this patent is extended or adjusted under 35 U.S.C. 154(b) by 94 days.

(21) Appl. No.: 15/194,731

(22) Filed: Jun. 28, 2016

(51) Int. Cl.
| | |
|---|---|
| *F25B 43/00* | (2006.01) |
| *F25B 13/00* | (2006.01) |
| *C09K 3/12* | (2006.01) |
| *F25B 31/00* | (2006.01) |

(52) U.S. Cl.
CPC ............... *F25B 43/00* (2013.01); *C09K 3/12* (2013.01); *F25B 13/00* (2013.01); *F25B 31/002* (2013.01); *F25B 2500/14* (2013.01); *F25B 2500/22* (2013.01)

(58) Field of Classification Search
CPC ........ F25B 43/00; F25B 13/00; F25B 31/002; F25B 2500/14; F25B 31/00; F25B 45/00; F25B 23/006; F25B 41/003; F25B 41/062; F25B 2400/18; F25B 2345/001; F25B 2345/006; F25B 43/006; F25B 2500/222; F25B 2500/22

USPC ....................................................... 62/77, 292
See application file for complete search history.

(56) References Cited

U.S. PATENT DOCUMENTS

| | | | | |
|---|---|---|---|---|
| 3,538,961 | A  * | 11/1970 | Bruce ................ | B60H 1/00585 141/61 |
| 4,237,172 | A | 12/1980 | Packo et al. | |
| 5,996,651 | A | 12/1999 | Scaringe et al. | |
| 6,564,613 | B1 * | 5/2003 | Speer .................... | F25B 49/005 73/40.5 R |
| 7,127,902 | B1 * | 10/2006 | Levy .................. | B60H 1/00585 138/97 |
| 7,296,423 | B2 * | 11/2007 | Appler ............... | B60H 1/00585 62/114 |
| 8,631,662 | B2 * | 1/2014 | Castle ................. | G01M 3/3227 236/49.3 |
| 2002/0189265 | A1* | 12/2002 | Ferris ....................... | C09K 3/12 62/77 |
| 2009/0176905 | A1* | 7/2009 | Matsuzawa ........... | C08F 290/14 522/46 |
| 2010/0037636 | A1* | 2/2010 | Junge ..................... | F25B 45/00 62/77 |
| 2011/0167841 | A1* | 7/2011 | Appler ............... | B60H 1/00585 62/77 |

(Continued)

OTHER PUBLICATIONS

United States Air Force Contract AF 33(616)-7006.

*Primary Examiner* — Mohammad M Ali

(57) ABSTRACT

A moisture treatment and leak sealant product for a vapor-compression system has two separate components. One of the components includes a viscosity modifying additive, excluding oil compounds, to more closely match a viscosity of the product to that of lubricating oil in the system and a drying agent to remove moisture from the system. The second of the components includes a silane leak sealant and also the viscosity modifying additive.

23 Claims, 1 Drawing Sheet

(56) References Cited

U.S. PATENT DOCUMENTS

2014/0165625 A1  6/2014  Appler et al.

* cited by examiner

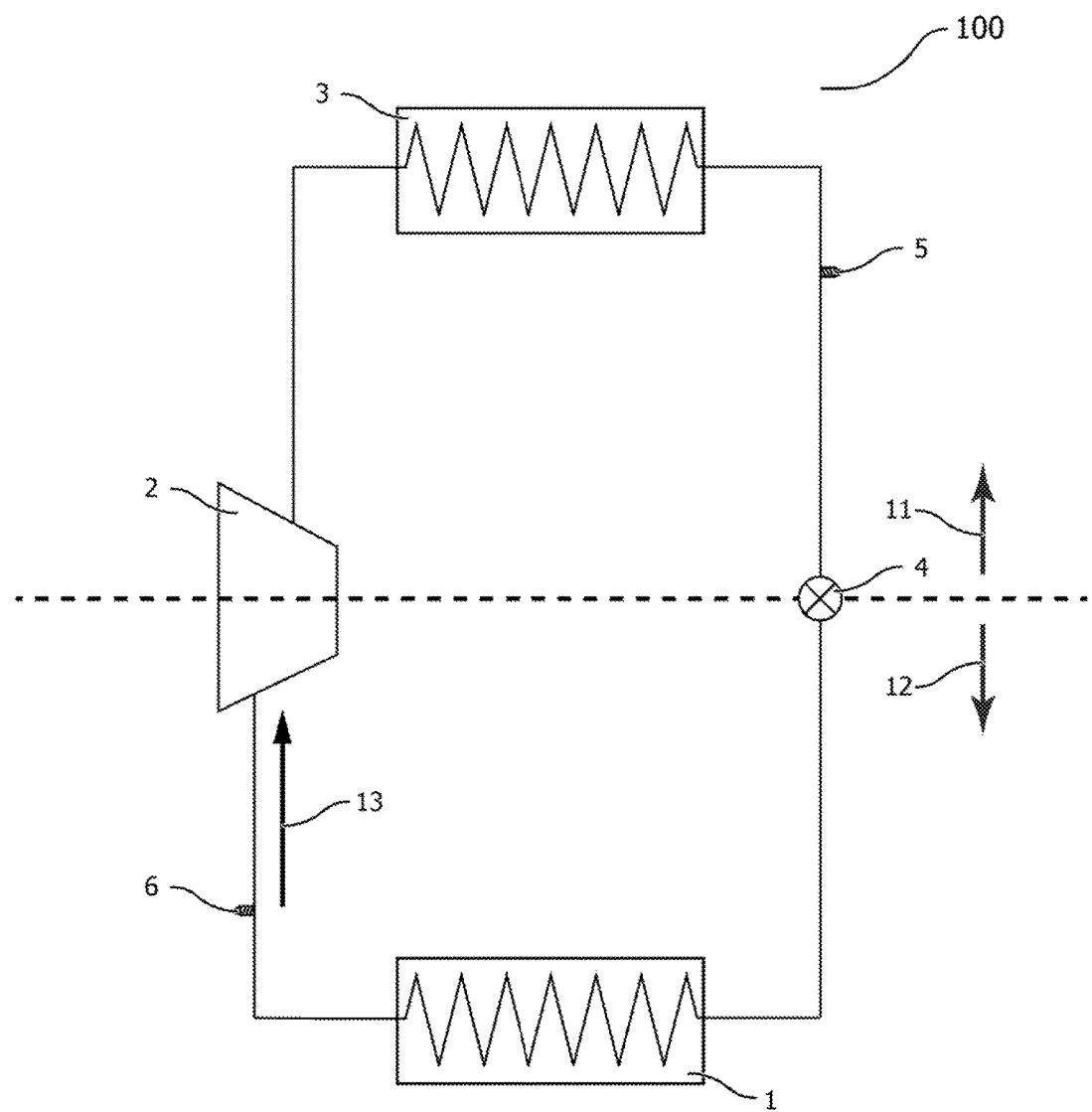

HVAC/R SYSTEM SEALANT AND DRYING COMPOSITION, AND METHOD FOR SEALING AND REMOVING MOISTURE THEREWITH

CROSS-REFERENCE TO RELATED APPLICATIONS

This application is related to U.S. patent application Ser. No. 14/959,395, filed Dec. 4, 2015 and titled "System and Method Introducing Liquid Additive into a Vapor Compression System via a Pressurized Can and Optionally for Purging a Connecting Hose" and U.S. patent application Ser. No. 15/178,175, filed on Jun. 9, 2016 and titled "HVAC/R SYSTEM REFRIGERANT AND OIL CONDITIONING COMPOSITION, AND METHOD FOR REMOVING ACID AND MOISTURE THEREWITH."

BACKGROUND OF THE INVENTION

Leaks can form in HVAC/R systems for a variety of reasons including corrosion and physical damage. The loss of refrigerant from a leak causes system components to freeze and will eventually cause the system to stop functioning. Replacement of the lost refrigerant is costly and emissions of refrigerant vapors are damaging to the environment.

Several leak sealant formulations have been developed over the years for use in HVAC/R systems. Many of these are based on the polymerization of organosilanes as taught by U.S. Pat. No. 4,237,172. Alkoxysilanes have hydrolysable alkoxy groups that react with water to form an alcohol and a silanol. The silanols rapidly condense with each another to form an insoluble polymeric network of organosilanes. These reactions are meant to occur at the leak site where atmospheric moisture condenses due to the presence of a local temperature minimum caused by evaporating refrigerant. It is detrimental to have the leak sealants polymerize in the interior of the system away from a leak site because the chemicals are consumed before leaks can be sealed, and polymerization can clog internal HVAC/R components or negatively affect the lubrication qualities of the oil.

Moisture can enter the refrigeration system through improper evacuation procedures or by the service technician or manufacturer inadvertently introducing oil that is saturated with moisture due to extended exposure of the oil to the ambient air (which usually contains very high levels of moisture relative to the limits in a refrigeration system). This undesirable internal system moisture can react with sealants. It is therefore critical to ensure that the system is largely free of moisture before introducing the sealant.

Despite all attempts to keep the HVAC/R system as dry as possible, moisture can still enter the system and be absorbed into the oil. Although polyolester (POE) oil is hygroscopic and will readily absorb moisture upon exposure, even mineral oils can absorb moisture albeit their saturated moisture levels being much lower about 25 parts per million (ppm) for mineral oil compared to 2,500 for POE oil, 6,500 for polyvinylether (PVE) oil and 10,000 PPM for polyalkylene glycol (PAG) oil. Even with mineral oil's much lower saturation moisture levels, however, it is typically not practical to change out the oil and the refrigerant in the event of moisture contamination.

One way to remove moisture from an HVAC/R system to prevent side-reactions with leak sealants is by the introduction of a chemical additive to the system that consumes water via a chemical reaction. U.S. Patent Application No. 2014/0165625 A1 teaches the use of hydrolytic orthoesters drying agents which are introduced into an operating HVAC/R system. Orthoesters are specifically emphasized as hydrolytic moisture scavenging additives and only broadly suggests the use of hydrolytic drying agents (e.g. acetals, epoxides and carbodiimides). While orthoesters, specifically orthoformates, remove water from refrigeration oils, they can react to form an ester and an alcohol, which in and of itself would be acceptable; however, esters can then be hydrolyzed further to form acid (e.g. formic acid) under certain conditions which is highly undesirable in HVAC/R system. Therefore, an improved moisture removal additive is desperately needed for HVAC/R systems that would not potentially hydrolyze to form acids since acids are responsible for corrosion, compressor burn-outs and continued oil/refrigerant degradation.

It is also well known in the art to use silanes as moisture scavengers; however, the use of silanes can interfere with the action of silane-based leak sealing additives and therefore is not optimal. That is, the silanes used for moisture removal are selected to form soluble polymers that stay dissolved in the oil whereas silanes used to seal leaks are designed to form highly cross-linked insoluble polymers at the leak site. The moisture removing silanes could thus prevent cross-linking of the leak sealing chemicals and reduce their effectiveness.

To resolve the problem of undesired by-products of the moisture drying reaction, we discovered a drying formulation for removing moisture from the refrigerant and oil in operating HVAC/R systems. The drying agent capitalizes on the hydrolysis of 2,2-dimethoxypropane to remove the moisture from the refrigerant and oil by consuming the water molecules and advantageously producing methanol as well as producing acetone which does react any further in the HVAC/R system. The problem that occurs when using orthoformates, namely the buildup of acid due to over-hydrolysis of orthoformates that are used in HVAC/R drying formulas such as the above-referenced U.S. Patent Application No. US2014/0165625 A1 is avoided by the use of our invention.

As stated earlier, while U.S. Patent Application No. 2014/0165625 A1 only broadly suggests the use of hydrolytic drying agents including acetals and 2,2-dimethoxypropane is also known as acetone dimethyl acetal, the prior art did not recognize, as we did, that 2,2-dimethoxypropane is a far superior drying agent that will not form unwanted harmful reaction products. Furthermore, the prior art did not realize that this compound's reaction with the water molecules produces methanol which will liberate the trapped acid from the oil allowing it to vaporize and travel to the filter drier, thereby accelerating the removal of acid from the system. United States Air Force Contract AF 33(616)-7006 taught the use of 2,2-dimethoxypropane, anhydrous hydrazine, trimethyl orthoacetate, trimethyl orthoformate, trimethyl orthovalerate as well as two silanes only to prevent fuel filter icing in mineral-oil based aviation fuels but provided no guidance for use of 2,2-dimethoxypropane in HVAC/R systems or even hinted at their superiority in not further hydrolyzing to acid, as is possible with orthoesters.

U.S. Patent Application No. 2014/0165625 A1 describes experiments with orthoester drying agents in mineral oil doped with 1 wt % water. This scenario is an extreme case given that mineral oil will only absorb approximately 25 ppm moisture. Therefore, the 1 wt % water will be largely present in a second phase separate from the mineral oil. This is not reflective of typical conditions inside an HVAC/R system when contaminated with moisture. U.S. Patent Application No. 2014/0165625 goes on to teach that the reaction rate of moisture with the orthoester drying agent is faster than the reactions of moisture with leak sealants. Faster reaction rate is said to allow both the drying agent and leak sealant to be injected into the system at the same time because the drying agent will react with any moisture present before detrimental polymerization of the leak sealant can occur inside the HVAC/R system. However, our experiments, with moisture levels that are both realistic and characteristic of HVAC/R systems, have shown this not to be the case. Even for POE lubricants which have a much larger capacity for moisture absorption (2,500 ppm verses 25 ppm for mineral oil), the rate of reaction with the drying agent is normally not sufficient to prevent polymerization of the leak sealant if they are introduced simultaneously. This is because the rate of hydrolysis of the drying agent is much slower in oil solvent, as compared to in a separate aqueous phase as was the case in Table 6 of U.S. Patent Application No. 2014/0165625.

BRIEF DESCRIPTION OF THE DRAWING

These and other advantages and aspects of our invention will become more readily apparent from the following detailed description when taken in conjunction with the accompanying sole FIGURE of a conventional vapor compression system used for applications such as an HVAC, HVAC/R, freezer, thermal control and the like.

DETAILED DESCRIPTION OF THE INVENTION

We have discovered that 2,2-dimethoxypropane can be used prior to a silane leak sealant in an HVAC/R vapor compression system designated generally by numeral 100 in the sole FIGURE to protect against polymerization within the system due to moisture contamination. A most basic representation of a vapor compression system 100 with which the formulation of the present invention can be employed includes basic hardware components such as an evaporator 1, compressor 2, condenser 3, and expansion device 4. This type of vapor compression system 100 can be employed as a heat pump, refrigerator, freezer, thermal control device, refrigerant recovery apparatus, refrigerant recycling apparatus or refrigerant reclamation apparatus, all of which are well known applications of such a system. The vapor compressor system is typically fitted with a low-pressure service port 6, typically located downstream of the outlet of the evaporator 1, and high-pressure service port 5, typically located downstream of the condenser 3 and these service ports are used to access the low-pressure and high-pressure sides of the system. The compressor 2 and throttling device 4 separate the high- and low-pressure sides of the system as indicated by arrow 11 which points towards the high-pressure side and arrow 12 which points to the low-pressure side of the system Finally arrow 13 indicates the direction of refrigerant flow through the system 100. A two-part formulation is superior to a single composition because it enables the user to introduce the drying agent before and separately from the sealant. This ensures that the drying agent has enough time to remove moisture from the system even when a separate aqueous phase is not present and the moisture is present in the oil phase.

A currently preferred embodiment of our two-part formulation has a first part that is composed of about 1% to 100% by weight 2,2-dimethoxypropane combined with about 0% to 99% weight percent tetraglyme. The 2,2-dimethoxypropane is used to remove the moisture from the refrigerant and oil by consuming the water molecules, but the viscosity of 2,2-dimethoxypropane is very low at 0.5 cSt at 25° C. It is well known that lowering the viscosity of any compressor lubricant can potentially shorten the life of the compressor 2, so a compatible additional additive to increase the viscosity of the mixture is needed. Tetraglyme has a viscosity of 4 cSt at 25 C, and we have discovered it is an ideal additive to increase the viscosity of the mixture to more closely approach the viscosity of the lubricant that the mixture is being added to while also improving cooling performance as taught by U.S. Pat. No. 5,826,436, the disclosure of which is incorporated herein by reference. As discussed in that U.S. patent, the tetraglyme increases the latent heat due to adsorption and desorption of refrigerant and also can improve a system's longevity, thereby making it an ideal additive to increase the viscosity of the mixture.

The currently preferred embodiment of the two-part formulation has a second part that is composed of about 1% to 100% by weight of a silane or mixture of silanes combined with about 0% to 99% weight percent tetraglyme. The tetraglyme is once again used to adjust the viscosity of the mixture to bring it closer to the viscosity of the compressor oil in the system. The silane or silane mixture is used to seal any potential leaks in the HVAC/R system while also improving cooling efficiency and reducing wear via the addition of tetraglyme. This formulation also works effectively with all refrigerants and lubricants including CFC, HCFC, HFC, and HFO refrigerants as well as with mineral and synthetic lubricants.

The drying and sealant formulation is best added to the oil sump 6 of the compressor 2 since the majority of the moisture is in the oil and the oil sump represents the largest accumulation of oil anywhere in the system. The currently preferred way of introducing the formulation to the oil sump is at the low-pressure side 8 of a system, via an existing service port 9, located after the expansion device 4, that leads directly to the oil sump of the compressor.

As is well known in the art, and discussed previously, all vapor compressor systems, such as the very simple basic vapor-compression circuit 100 of the sole FIGURE, that would be used for, say, air conditioning, refrigeration and the like are typically fitted with a low-pressure service port 6, typically located downstream of the outlet of the evaporator 1, and high-pressure service port 5, typically located downstream of the condenser 3 and these service ports are used to access the low-pressure 12 and high-pressure 11 sides of the system. These service ports are used for attaching gauge sets to monitor high and low side system pressure as well as to add or remove refrigerant and evacuate the system (among other well-known uses). The use and location of service ports on vapor compression systems as well known in the art and there may be multiple service ports on both the high-side or low-side of a system. In an effort to reduce initial manufacturing costs, some smaller systems may not have any service ports; instead they are equipped with a Process Tube which can be used to attach a line-taping form of service port. These commercially available line-taping service ports can also be placed anywhere in the vapor compression refrigerant circuit. The pressure differential between the low-side service port 6 located on the low-pressure side 12 and high-pressure service port 5 located on the high-pressure side 11 of an operating system can be used to push each part of the two-part additive formula into the system using an apparatus described in U.S. Pat. No. 5,996,651, titled "A Method & Apparatus for Introducing Liquid Additive into Vapor Compression Systems", the subject matter of which is also incorporated herein by reference. U.S. Pat. No. 6,327,897, titled "Method of Introducing an In-Situant into a Vapor Compression System, Especially Useful for Leak Detection, as well as an Apparatus for Leak Detection and a Composition Useful for Leak Detection" also discusses this method of using the pressure differential created by operating the system, along with attaching to the service ports to introduce a liquid into an operating vapor compression system.

Instead of using the pressure difference to push the additives into the low pressure side 8 of an operating system, it is well known in the art to use a pressurized container that is filled with the alcohol and drying agent formulation and then pressurized with the refrigerant of the system, or one of the refrigerants of the system, if the refrigerant is a blend of refrigerants, and use the higher pressure in the container at ambient temperature conditions to push the additive into the low pressure side 8 of the operating system.

Alternatively, the drying agent formulation additive can be introduced into the system by the method described in above-referenced pending U.S. patent application Ser. No. 14/959,395. In this method of additive introduction, the liquid additive is packaged in a vessel like an aerosol can. A gas is then added to the vessel also during the vessel filling process, and the vessel is pressurized to near but above atmospheric pressure and always to a pressure below a design operational low-side pressure 8 of the system where the additive will be eventually introduced. To introduce the additive into a vapor compression system 1, the vessel that contains the liquid additive is connected to a low-side service port of the system. In a first or upright position of the vessel, with the system compressor not operating, and just prior to making the final connection to the system at the low-side service port 9, the gas in the vessel is used to purge the line connecting the vessel to the low-side service port, until the pressure in the vessel is at atmospheric pressure, then the final connection is completed and the vessel is re-pressurized by the pressure of the system, until the pressures in the vessel and the system are equalized. Thereafter, in a second or inverted position of the vessel, with the system compressor 2 now operational, the liquid additive is drawn into the system. Then with the system compressor again not in operation and the vessel returned to the first position, any liquid additive that has not been introduced into the system lines and remains in a connecting hose is flushed back into the vessel.

While we have shown and described a currently preferred embodiment in accordance with our invention, it should be understood that the same is susceptible of further changes and modifications without departing from the scope of our invention. We, therefore, do not intend to be limited to the details shown and described herein but intend to cover all such changes and modifications that are encompassed by the attached claims.

We claim:

1. A moisture treatment and leak sealant product for a vapor-compression system, comprising first and second separate components, a first of the components including a viscosity modifying additive excluding oil compounds to more closely match a viscosity of the product to that of lubricating oil in the system and a drying agent to remove moisture from the system, and a second of the components including a silane leak sealant and the viscosity modifying additive, wherein the viscosity modifying agent is a compound selected from the group consisting of ethers, esters, ketones, aldehydes, amines, anhydrides and amides, and exclude compound families with OH groups.

2. The product of claim 1 wherein the drying agent is 2,2-dimethoxypropane.

3. The product of claim 1 wherein the viscosity modifying agent is a compound selected from the group consisting of tetraglyme, triethylene glycol dimethyl ether, diethylene glycol diethyl ether, butyric anhydride, tetramethylurea, ethylene glycol diacetate, N,N-dimethylformamide, N,N dimethylacetamide, N,N-diethylformamide, or 2-octanone.

4. The product of claim 1, wherein the system is one of a refrigerator, a heat pump, a freezer, an air conditioner, a thermal control device, a refrigerant recovery apparatus, a refrigerant recycling apparatus and a refrigerant reclamation apparatus.

5. The product of claim 1, wherein the drying agent is present in a concentration of between about 1 and 99 percent by mass.

6. The product of claim 1, wherein the viscosity modifying additive is present in a concentration of between about 1 and 99 percent by mass.

7. The product of claim 1, wherein the silane leak sealant is present in a concentration of between about 1 and 99 percent by mass.

8. A moisture treatment and leak sealant product for a vapor-compression system, comprising first and second separate components, a first of the components including a viscosity modifying additive excluding oil compounds to more closely match a viscosity of the product to that of lubricating oil in the system and a drying agent to remove moisture from the system, and a second of the components including a silane leak sealant and the viscosity modifying additive, wherein the silane leak sealant is trimethoxyvinylsilane in a concentration of between about 1 and 100 percent by mass, N-3-trimethoxysilylpropylethylenediamine in a concentration of between about 1 and 100 percent by mass and trimethoxymethylsilane in a concentration of between about 1 and 10 percent by mass.

9. The product of claim 1, wherein the viscosity modifying additive is present in a concentration of between about 1 and 99 percent by mass.

10. The product of claim 8, wherein the viscosity modifying additive is a high viscosity liquid.

11. A method of removing moisture and sealing leaks in a vapor compression system, comprising first introducing a drying agent and a viscosity modifying agent excluding oil compounds, and then introducing a silane leak sealant and an additional amount of the viscosity modifying agent, wherein the viscosity modifying additive is a compound selected from the group consisting of ethers, esters, ketones, aldehydes, amines, anhydrides and amides, and exclude compound families with OH groups.

12. The method according to claim 11, wherein the drying agent is 2,2-dimethoxypropane.

13. The method according to claim 11, wherein the viscosity modifying additive is a compound selected from the group consisting of tetraglyme, triethylene glycol dimethyl ether, diethylene glycol diethyl ether, butyric anhydride, tetramethylurea, ethylene glycol diacetate, N,N-dimethylformamide, N,N dimethylacetamide, N,N-diethylformamide, or 2-octanone.

14. The method according to claim 11, wherein the system is one of a refrigerator, a heat pump, a freezer, an air conditioner, a thermal control device, a refrigerant recovery apparatus, a refrigerant recycling apparatus and a refrigerant reclamation apparatus.

15. The method according to claim 11, wherein the drying agent is present in a concentration of between about 1 and 99 percent by mass.

16. The method according to claim 11, wherein the viscosity modifying agent is present in a concentration of between about 1 and 99 percent by mass.

17. The method according to claim 11, wherein the silane leak sealant is present in a concentration of between about 1 and 99 percent by mass.

18. The method according to claim 11, wherein the silane leak sealant is compound selected from the group consisting of trimethoxyvinylsilane in a concentration of between about 1 and 100 percent by mass, N-3-trimethoxysilylpropylethylenediamine in a concentration of between about 1 and 100 percent by mass and trimethoxymethylsilane in a concentration of between about 1 and 10 percent by mass.

19. The method according to claim 18, wherein the viscosity modifying agent is a high viscosity liquid.

20. The method according to claim 11, wherein the viscosity modifying additive is present in a concentration of between about 1 and 99 percent by mass.

21. The method according to claim 11, wherein the introduction is into a compressor oil sump of the system.

22. The method according to claim 11, wherein the introduction occurs at a low-pressure side of the system during operation by using a pressure differential between high and low pressure sides of the system.

23. The method according to claim 22, wherein a low-pressure service port comprises a connection to the low pressure side, and a high-pressure service port comprises a connection to the high pressure side.

* * * * *